Dec. 8, 1925.
C. G. ROSS
1,564,279
BUMPER FOR MOTOR VEHICLES
Filed April 21, 1924
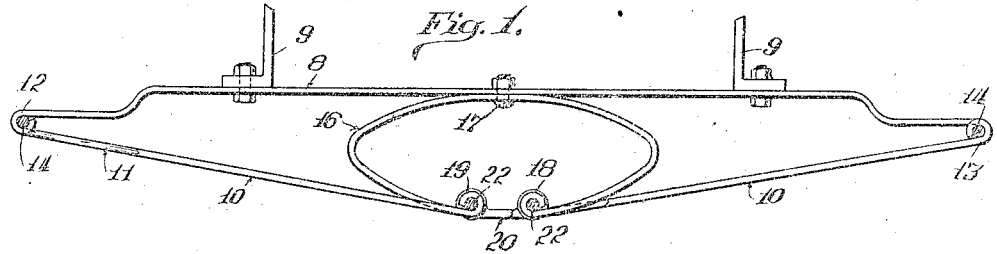
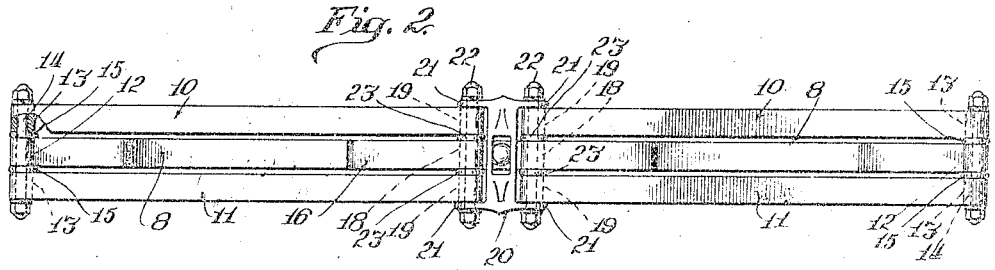
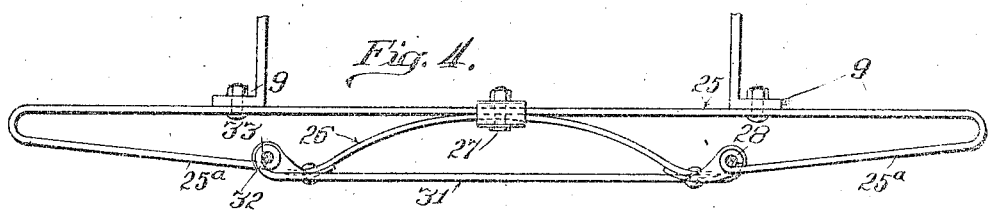
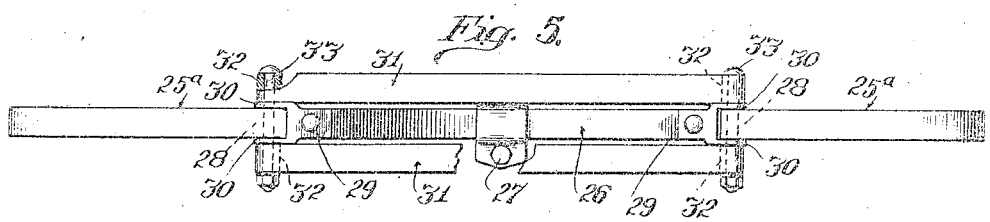
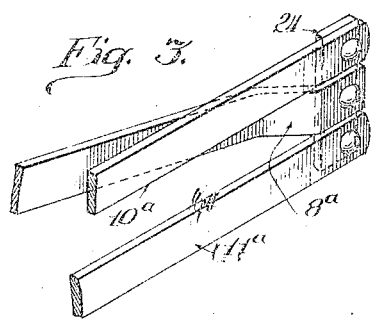
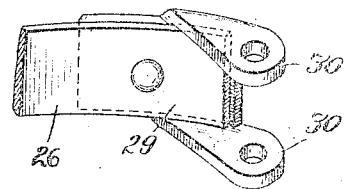
Inventor
Charles G. Ross
By Leslie W. Frick
Attorney Patented Dec. 8, 1925.

1,564,279

UNITED STATES PATENT OFFICE.

CHARLES G. ROSS, OF CHICAGO, ILLINOIS, ASSIGNOR OF ONE-HALF TO WILLIAM L. ROSS, OF CHICAGO, ILLINOIS.

BUMPER FOR MOTOR VEHICLES.

Application filed April 21, 1924. Serial No. 707,961.

*To all whom it may concern:*

Be it known that I, CHARLES G. ROSS, a citizen of the United States, residing at Chicago, in the county of Cook and State of Illinois, have invented certain new and useful Improvements in Bumpers for Motor Vehicles, of which the following is a specification.

My invention relates to improvement in bumpers for vehicles of various kinds and particularly for automobiles and trucks.

One of the objects of my invention is the provision of a bumper wherein the several parts are so arranged and articulated that they will be able to absorb all ordinary shocks due to collision without becoming damaged and without transmitting the shocks to the vehicle to which the bumper is attached.

A further object of my invention is the provision of a bumper which will be light in weight, economical to manufacture, strong and durable and so constructed that, should one of its parts be damaged in a collision, that part may be readily replaced without the necessity of replacing the undamaged parts.

The invention consists in the novel constructions arrangements and devices to be hereinafter described and claimed for carrying out the above stated objects and such other objects as will appear from the following description of certain preferred embodiments illustrated in the accompanying drawings, wherein—

Fig. 1 is a plan view of one form of bumper embodying the principles of my invention;

Fig. 2 is a front elevational view of the bumper shown in Fig. 1;

Fig. 3 is a detail view showing a modified form of connection between the outer ends of the impact bars and the supporting member of the bumper shown in the preceding views;

Fig. 4 is a plan view of a bumper also embodying the principles of my invention but of modified construction;

Fig. 5 is a front elevational view of the bumper shown in Fig. 4; and

Fig. 6 is a detail view of one of the connecting members employed in the bumper shown in Figs. 4 and 5.

Like characters of reference designate like parts in the several views.

Referring first to Figs. 1 and 2, the bumper therein shown includes a transversely extending resilient supporting bar 8 which may be mounted on the ends of the respective longitudinally extending channel members of the chassis frame (not shown) by any suitable means, for example, L-shaped bracket members 9. Two resilient impact members 10 placed end to end are disposed in a plane above that of the supporting member 8. Two resilient impact members 11 also placed end to end are disposed in a plane below that of the supporting member 8. The outer ends of the two sets of impact members are preferably pivotally connected to the outer ends of the supporting member in which case eyes 12 are formed on the extremities of the supporting member and eyes 13 are formed on the outer ends of each of the impact members. Two pintle members which may be in the form of bolts 14 are passed through the eyes of the upper set of impact members, the eyes of the supporting member and finally through the eyes of the lower set of impact members. Spacing members 15 are preferably provided on each of the pintle members, being interposed between the supporting member 8 and the respective sets of impact members. A resilient bar 16 of elliptical formation has its medial portion bearing against and fastened to the medial portion of the supporting member 8 by a bolt 17. The ends of the bar 16 terminates in eyes 18 which lie between the respective adjacent ends of the impact members 10 and 11. The adjacent ends of the impact members 10 and 11 terminate in eyes 19. A member 20 for flexibly connecting the adjacent ends of the impact members and the adjacent ends of the bar 16, is provided on its upper and lower ends with laterally extending perforated ears 21. Pintle members preferably in the form of bolts 22 extend through the upper ears 21, the eyes on the adjacent ends of the impact bars 10, the eyes on the adjacent ends of the bar 16, the eyes on the adjacent ends of the bars 11 and thence through the ears on the lower end of the connecting member. Spacing members 23 are preferably provided on each of the pintle members 22, being interposed between the eyes on the bar 16 and the eyes on the upper and lower impact members. It will be noted that the impact members are so arranged that they form in combination with the supporting bar 8 a structure of triangular formation. Shocks imparted to the medial portion of the impact means tend to force said portion closer to the supporting bar 8 which would tend to force backwardly the ends of the supporting bar, consequently the medial portion of the supporting bar tends to move forwardly and thus augments the shock absorptive capacity of the bowed member 16.

A modified form of connection between the outer ends of the impact members and the respective outer ends of the supporting member is shown in Fig. 3. In the modified construction, the outer ends of the impact bars 10ª and 11ª are riveted to a cross bar 24, the outer end of the supporting member 8ª also being riveted to said bar. While this form of connection is less expensive, it is not as desirable because the parts are not flexibly connected and, therefore, cannot move relatively to each other.

In that form of my invention shown in Figs. 4 and 5, the bumper includes a transversely extending resilient supporting bar 25 having its ends turned forwardly and then inwardly to provide the angularly disposed portions 25ª. A semi-elliptical resilient bar 26 has its medial portion bearing against and preferably connected, as by means of a bolt 27, to the medial portion of the bar 25. Eyes 28 are formed on the extremities of the portions 25ª. Connecting members 29, see Fig. 6, are mounted on the respective ends of the bar 26, each connecting member having spaced perforated ears 30 which straddle the eyes 28. Two impact members 31 are disposed so that one lies in a plane above and the other in a plane below that occupied by the supporting member 25 and the resilient buffer member 26. Eyes 32 are provided on the ends of the impact members. Pintle members which may be in the form of bolts 33 pivotally connect the respective extremities of the impact members with the extremities of the resilient bar 26 and the extremities of the portions 25ª, said pintle members extending through the eyes of the upper impact member, the upper ears of the connecting members 29, the eyes 28, the lower ears of the connecting members 29 and thence through the eyes of the lower impact member.

It will be noted that the four impact members of the bumper shown in Figs. 1 and 2 and the two impact members of the bumper shown in Figs. 4 and 5 are alike in construction, hence they may be made from the same die or with the same tools. The manufacture of parts identical in construction keeps down the initial investment for dies, tools, etc., facilitates assembling of the parts forming the bumpers and reduces the number of repair parts that a dealer has to carry in stock. Furthermore, should one of the impact members become damaged for any reason, it is unnecessary to discard the entire bumper, as the damaged part may be readily replaced independent of the other parts. It will be noted that the resilient supporting bars 8 and 25, the impact members 10, 11 and 31 and the resilient buffer bars 16 and 26 may all be made of stock of the same cross-section which is a considerable advantage in the manufacture of an article of this kind on a heavy production basis.

In both forms of my invention the supporting bar in combination with the impact members forms a resilient structure arranged in loop formation. The inherent tendency of the resilient structure to resist deformation under a shock is augmented by the resilient buffer means positioned within the structure between the impact means and the supporting member. The shackle-like connections between the respective outer ends of the impact bars and the ends of the supporting member and the similar connections between the extremities of the resilient buffer bar and the impact members provides a construction which has great capacity for flexing and absorbing shocks. A shock imparted to any one part is to a very considerable extent uniformly distributed to and absorbed by all the other parts. The construction and arrangement of the parts of the bumper are such that the bumper has great capacity for withstanding and absorbing shock without transmitting its effect to the vehicle; nevertheless the parts of the bumper by reason of their arrangement may be relatively light in weight, which is very desirable both from the standpoint of the manufacturer and the user. The spaced impact members provide a relatively wide impact area and thus prevent the bumper on another vehicle from passing thereover or thereunder, as so frequently happens with bumpers of the single impact bar type.

I do not intend to limit my invention to the details of construction shown and described, except only in so far as certain of the appended claims are specifically so limited, as it will be obvious that modifications may be made without departing from the principles of my invention.

I claim:

1. A bumper of the class described comprising, in combination, unitary transversely extending supporting means, impact means connected at its respective extremities to the extremities of said supporting means and a bowed resilient buffer bar interposed between and having its extremities pivotally connected to one of and its medial portion bearing against the other of said means.

2. A bumper of the class described comprising, in combination, unitary transversely extending supporting means, impact means connected at its respective extremities to the extremities of said supporting means, and a bowed resilient buffer bar interposed between said means and having its extremities pivotally connected to said impact means and its medial portion bearing against said supporting means.

3. A bumper of the class described comprising, in combination, transversely extending supporting means, impact means including a pair of members placed end to end and having their outer ends connected to the respective ends of said supporting means, a connection between the adjacent ends of said impact members, and a bowed resilient buffer bar interposed between and having its extremities pivotally connected to one of and its medial portion bearing against the other of said means.

4. A bumper of the class described comprising, in combination, transversely extending supporting means, impact means including a pair of impact members placed end to end and having their outer ends connected to the respective ends of said supporting means, a connection between the adjacent ends of said impact members, and a bowed resilient buffer bar interposed between said means and having its extremities pivotally connected with said respective impact members and its medial portion bearing against said supporting means.

5. A bumper of the class described comprising, in combination, transversely extending supporting means, a pair of impact members placed end to end and having their outer ends connected to the respective ends of said supporting means, a shackle connection between the adjacent ends of said impact members, and resilient buffer means interposed between said supporting means and said impact members.

6. A bumper of the class described comprising, in combination, transversely extending supporting means, impact means including a pair of members placed end to end and having their outer ends connected to the respective ends of said supporting means, a shackle connection between the adjacent ends of said members, and a bowed resilient buffer bar interposed between and having its extremities pivotally connected to one of and its medial portion bearing against the other of said means.

7. A bumper of the class described comprising, in combination, transversely extending supporting means, impact means including a pair of members placed end to end and having their outer ends connected to the respective ends of said supporting means, a shackle connection between the adjacent ends of said members, and a bowed resilient buffer bar interposed between said means and having its extremities pivotally connected with said respective impact members and its medial portion bearing against said supporting means.

8. A bumper of the class described comprising, in combination, transversely extending supporting means, impact means including a pair of members placed end to end and having their outer ends connected to the respective ends of said supporting means, a resilient buffer bar interposed between said supporting means and said impact members and bowed so that its medial portion bears against said supporting means and its extremities lie adjacent the adjacent ends of said impact members, and a shackle connection between the adjacent ends of said impact members and the ends of said buffer bar.

9. A bumper of the class described comprising, in combination, transversely extending supporting means, a pair of impact members placed end to end and having their outer ends pivotally connected to the respective ends of said supporting means, a shackle connection between the adjacent ends of said impact members, and resilient buffer means interposed between said supporting means and said impact members.

10. A bumper of the class described comprising, in combination, transversely extending supporting means, impact means including a pair of members placed end to end and having their outer ends pivotally connected to the respective ends of said supporting means, a shackle connection between the adjacent ends of said members, and a bowed resilient buffer bar interposed between and having its extremities pivotally connected to one of and its medial portion bearing against the other of said means.

11. A bumper of the class described comprising, in combination, transversely extending supporting means, impact means including a pair of members placed end to end and having their outer ends pivotally connected to the respective ends of said supporting means, a shackle connection between the adjacent ends of said members, and a bowed resilient buffer bar interposed between said means and having its extremities pivotally connected with said respective impact members and its medial portion bearing against said supporting means.

12. A bumper of the class described comprising, in combination, transversely extending supporting means, impact means including a pair of members placed end to end and having their outer ends pivotally connected to the respective ends of said supporting means, a resilient buffer bar interposed between said supporting means and said impact members and bowed so that its medial portion bears against said supporting means and its extremities lie adjacent the adjacent ends of said impact members, and a shackle connection between the adjacent ends of said impact members and the ends of said buffer bar.

13. A bumper of the class described comprising, in combination, unitary transversely extending supporting means, a pair of spaced impact means arranged one above the other in a common vertical plane and having their respective extremities connected to the respective extremities of said supporting means, and a bowed resilient buffer bar interposed between said supporting means and said impact means and having its extremities pivotally connected to one of and its medial portion bearing against the other of said means.

14. A bumper of the class described comprising, in combination, unitary transversely extended supporting means, a pair of spaced impact means arranged one above the other in a common vertical plane and having their respective extremities pivotally connected to the respective extremities of said supporting means, and a bowed resilient buffer bar interposed between said supporting means and said impact means and having its extremities pivotally connected to one of and its medial portion bearing against the other of said means.

15. A bumper of the class described comprising, in combination, unitary transversely extending supporting means, a pair of spaced impact means arranged one above the other in a common vertical plane and having their respective extremities connected to the respective extremities of said supporting means, and a bowed resilient buffer bar interposed between said supporting means and said impact means and having its extremities pivotally connected to said impact means and its medial portion bearing against said supporting means.

16. A bumper of the class described comprising, in combination, unitary transversely extending supporting means, a pair of spaced impact means arranged one above the other in a common vertical plane and having their respective extremities pivotally connected to the respective extremities of said supporting means, and a bowed resilient buffer bar interposed between said supporting means and said impact means and having its extremities pivotally connected to said impact means and its medial portion bearing against said supporting means.

17. A bumper of the class described comprising, in combination, transversely extending supporting means, impact means including a plurality of pairs of impact members the members of each pair being placed end to end and having their outer ends connected to the respective ends of said supporting means, connecting means between the adjacent ends of the impact members of each pair, and a bowed resilient buffer bar interposed between said supporting and impact means and having its extremities pivotally connected to one of and its medial portion bearing against the other of said last-named means.

18. A bumper of the class described comprising in combination, transversely extending supporting means, impact means including a plurality of pairs of impact members the members of each pair being placed end to end and having their outer ends connected to the respective ends of said supporting means, connecting means between the adjacent ends of the impact members of each pair, and a bowed resilient buffer bar interposed between said supporting and impact means and having its extremities pivotally connected with said respective impact members and its medial portion bearing against said supporting means.

19. A bumper of the class described comprising, in combination, transversely extending supporting means, a plurality of pairs of impact members the members of each pair being placed end to end and having their outer ends connected to the respective ends of said supporting means, shackle connecting means between the adjacent ends of the impact members of each pair, and resilient buffer means interposed between said supporting means and said impact members.

20. A bumper of the class described comprising, in combination, transversely extending supporting means, impact means including a plurality of impact members the members of each pair being placed end to end and having their outer ends connected to the respective ends of said supporting means, shackle connecting means between the adjacent ends of the impact members of each pair, and a bowed resilient buffer bar interposed between said supporting and impact means and having its extremities pivotally connected to one of and its medial portion bearing against the other of said last-named means.

21. A bumper of the class described comprising, in combination, transversely extending supporting means, impact means including a plurality of pairs of impact members the members of each pair being placed end to end and having their outer ends connected to the respective ends of said supporting means, shackle connecting means between the adjacent ends of the impact members of each pair, and a bowed resilient buffer bar interposed between said supporting and impact means and having its extremities pivotally connected with said respective impact members and its medial portion bearing against said supporting means.

22. A bumper of the class described comprising, combination, transversely extending supporting means, impact means including a plurality of pairs of impact members the members of each pair being placed end to end and having their outer ends connected to the respective ends of said supporting means, a resilient buffer bar interposed between said supporting means and said impact members and bowed so that its medial portion bears against said supporting means and its extremities lie adjacent the adjacent ends of the impact members of each pair, and shackle connecting means between the adjacent ends of the impact members of each pair and the ends of said buffer bar.

23. A bumper of the class described comprising, in combination, transversely extending supporting means, a plurality of pairs of impact members the members of each pair being placed end to end and having their outer ends pivotally connected to the respective ends of said supporting means, shackle connecting means between the adjacent ends of the impact members of each pair, and resilient buffer means interposed between said supporting means and said impact members.

24. A bumper of the class described comprising, in combination, transversely extending supporting means, impact means including a plurality of pairs of impact members the members of each pair being placed end to end and having their outer ends pivotally connected to the respective ends of said supporting means, shackle connecting means between the adjacent ends of the impact members of each pair, and a bowed resilient buffer bar interposed between said supporting and impact means and having its extremities pivotally connected to one of and its medial portion bearing against the other of said last-named means.

25. A bumper of the class described comprising, in combination, transversely extending supporting means, impact means including a plurality of pairs of impact members the members of each pair being placed end to end and having their outer ends pivotally connected to the respective ends of said supporting means, shackle connecting means between the adjacent ends of the impact members of each pair, and a bowed resilient buffer bar interposed between said supporting and impact means and having its extremities pivotally connected with said respective impact members and its medial portion bearing against said supporting means.

26. A bumper of the class described comprising, in combination, transversely extending supporting means, impact means including a plurality of pairs of impact members the members of each pair being placed end to end and having their outer ends pivotally connected to the respective ends of said supporting means, a resilient buffer bar interposed between said supporting means and said impact members and bowed so that its medial portion bears against said supporting means and its extremities lie adjacent the adjacent ends of the impact members of each pair, and shackle connecting means between the adjacent ends of the impact members of each pair and the ends of said buffer bar.

27. A bumper of the class described comprising, in combination, resilient transversely extending supporting means, resilient impact means the end portions of which are arranged so as to form with said supporting means a structure of triangular formation, means connecting the outer ends of said impact end portions with the respective ends of said supporting means, and a bowed resilient bar interposed between said supporting and impact means and having its extremities pivotally connected to one of and its medial portion bearing against the other of said last-named means.

28. A bumper of the class described comprising, in combination, resilient transversely extending supporting means, resilient impact means the end portions of which are arranged so as to form with said supporting means a structure of triangular formation, means connecting the outer ends of said impact end portions with the respective ends of said supporting means, and a bowed resilient buffer bar interposed between said supporting and impact means and having its extremities pivotally connected to said impact means and its medial portion bearing against said supporting means.

29. A bumper of the class described comprising, in combination, resilient transversely extending supporting means, impact means including a pair of members placed end to end and arranged so as to form with said supporting means a structure of triangular formation, means connecting the outer ends of said members with the respective ends of said supporting means, means connecting the adjacent ends of said members, and buffer means interposed between said impact members and said supporting means.

30. A bumper of the class described comprising, in combination, resilient transversely extending supporting means, impact means including a pair of members placed end to end and arranged so as to form with said supporting means a structure of triangular formation, means connecting the outer ends of said members with the respective ends of said supporting means, means connecting the adjacent ends of said members, and a bowed resilient bar interposed between said supporting and impact means and having its extremities pivotally connected to one of and its medial portion bearing against the other of said last-named means.

31. A bumper of the class described comprising, in combination, resilient transversely extending supporting means, impact means including a pair of members placed end to end and arranged so as to form with said supporting means a structure of triangular formation, means connecting the outer ends of said members with the respective ends of said supporting means, means connecting the adjacent ends of said members, and a bowed resilient buffer bar interposed between said supporting and impact means and having its extremities pivotally connected to said impact means and its medial portion bearing against said supporting means.

32. A bumper of the class described comprising, in combination, resilient transversely extending supporting means, impact means including a pair of members placed end to end and arranged to form with said supporting means a structure of triangular formation, means pivotally connecting the outer ends of said members with the respective ends of said supporting means, shackle means for connecting the adjacent ends of said members, and buffer means interposed between said impact members and said supporting means.

33. A bumper of the class described comprising, in combination, resilient transversely extending supporting means, impact means including a pair of members placed end to end and arranged to form with said supporting means a structure of triangular formation, means pivotally connecting the outer ends of said members with the respective ends of said supporting means, shackle means for connecting the adjacent ends of said members, and a bowed resilient bar interposed between said supporting and impact means and having its extremities pivotally connected to one of and its medial portion bearing against the other of said last-named means.

34. A bumper of the class described comprising, in combination, resilient transversely extending supporting means, impact means including a pair of members placed end to end and arranged to form with said supporting means a structure of triangular formation, means pivotally connecting the outer ends of said members with the respective ends of said supporting means, shackle means for connecting the adjacent ends of said members, and a bowed resilient buffer bar interposed between said supporting and impact means and having its extremities pivotally connected to said impact means and its medial portion bearing against said supporting means.

CHARLES G. ROSS.